(12) United States Patent
Pietsch et al.

(10) Patent No.: US 11,402,497 B2
(45) Date of Patent: Aug. 2, 2022

(54) DEVICE FOR A VEHICLE

(71) Applicant: Robert Bosch GmbH, Stuttgart (DE)

(72) Inventors: Andreas Pietsch, Bietigheim-Bissingen (DE); Martin Nezadal, Leonberg (DE); Andreas Fink, Stuttgart (DE); Daniel Christoph Meisel, Bruchsal (DE); Eugen Dietz, Boennigheim (DE); Juergen Frasl, Kirchardt (DE); Sven Heider, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/943,148

(22) Filed: Jul. 30, 2020

(65) Prior Publication Data

US 2021/0063567 A1 Mar. 4, 2021

(30) Foreign Application Priority Data

Aug. 30, 2019 (DE) .......................... 102019213170.0

(51) Int. Cl.
*G01S 13/931* (2020.01)
*H01Q 1/32* (2006.01)
*H04L 12/40* (2006.01)

(52) U.S. Cl.
CPC ......... *G01S 13/931* (2013.01); *H01Q 1/3233* (2013.01); *H01Q 1/3283* (2013.01); *H04L 12/40* (2013.01); *G01S 2013/9315* (2020.01); *G01S 2013/93274* (2020.01); *H04L 2012/40273* (2013.01)

(58) Field of Classification Search
CPC .. G01S 2013/9315; G01S 2013/93274; H01Q 1/42; H01Q 1/3233; H01Q 1/3283
See application file for complete search history.

(56) References Cited

U.S. PATENT DOCUMENTS

| | | | | |
|---|---|---|---|---|
| 5,493,269 A | * | 2/1996 | Durley .................... | B60Q 1/50 340/901 |
| 6,400,308 B1 | * | 6/2002 | Bell ...................... | G01S 13/931 340/901 |
| 9,097,800 B1 | * | 8/2015 | Zhu ........................ | G01S 13/931 |
| 10,336,253 B1 | * | 7/2019 | Hsu ................ | B60W 30/18145 |

(Continued)

FOREIGN PATENT DOCUMENTS

| | | |
|---|---|---|
| DE | 102010034073 A1 | 2/2012 |
| JP | 2004309275 A | 11/2004 |
| JP | 2007057483 A | 3/2007 |

OTHER PUBLICATIONS

Garrott and Flick: "Hardware Evaluation of Heavy Truck Side and Rear Object Detection Systems", Konferenzbeitrag "IBEC 2003" UND SAE Technical Paper Series, (1995), Article 951010, XP055733457, pp. 1-25.

(Continued)

*Primary Examiner* — Peter M Bythrow
(74) *Attorney, Agent, or Firm* — Norton Rose Fulbright US LLP; Gerard Messina

(57) ABSTRACT

A device for a vehicle, which is attached to a vehicle, in particular, a commercial vehicle, and in which at least one or multiple surroundings sensor(s) is/are attached, a housing wall of the device being made from a material pervious to sensor radiation, and at least one housing wall of the device being made from a material absorbing sensor radiation.

15 Claims, 2 Drawing Sheets

(56) References Cited

U.S. PATENT DOCUMENTS

| | | | |
|---|---|---|---|
| 2002/0067305 A1* | 6/2002 | LeBlanc | G01S 13/48 342/198 |
| 2004/0036645 A1* | 2/2004 | Fujieda | H01Q 1/421 342/72 |
| 2005/0001757 A1* | 1/2005 | Shinoda | H01Q 1/42 342/70 |
| 2005/0195383 A1* | 9/2005 | Breed | G01S 7/4802 356/28 |
| 2006/0290564 A1* | 12/2006 | Sasada | G01S 13/931 342/107 |
| 2007/0067081 A1* | 3/2007 | Ton | B60Q 9/008 701/41 |
| 2007/0159380 A1* | 7/2007 | Nagaishi | G01S 13/931 257/E25.031 |
| 2007/0182528 A1* | 8/2007 | Breed | B60W 30/16 348/148 |
| 2007/0241962 A1* | 10/2007 | Shinoda | H01Q 1/425 342/361 |
| 2008/0119993 A1* | 5/2008 | Breed | G01S 13/931 701/45 |
| 2009/0093928 A1* | 4/2009 | Getman | G01S 15/931 701/37 |
| 2010/0321230 A1* | 12/2010 | Takeuchi | G01S 7/03 342/70 |
| 2014/0375490 A1* | 12/2014 | Pfitzenmaier | H01Q 17/00 342/4 |
| 2015/0123872 A1* | 5/2015 | Fujita | G01S 7/03 343/872 |
| 2015/0247924 A1* | 9/2015 | Kishigami | G01S 7/411 342/146 |
| 2016/0023624 A1* | 1/2016 | Schaaf | B60R 19/03 427/8 |
| 2016/0370456 A1* | 12/2016 | Emanuelsson | H01Q 1/3291 |
| 2017/0057441 A1* | 3/2017 | Perucca | B60R 19/483 |
| 2018/0217254 A1* | 8/2018 | Hong | H01Q 21/24 |
| 2019/0204845 A1* | 7/2019 | Grossman | G01S 7/4813 |
| 2019/0257936 A1* | 8/2019 | Balogh | G01S 17/58 |
| 2020/0122740 A1* | 4/2020 | Fritzson | B60W 50/0098 |
| 2020/0191951 A1* | 6/2020 | Reilly | G01S 13/931 |
| 2020/0341118 A1* | 10/2020 | Chen | G05D 1/024 |
| 2021/0080568 A1* | 3/2021 | Brown | G01S 13/931 |

OTHER PUBLICATIONS

Blind Spot Detection System by WABCO, OnSide (2018), XP055733456, pp. 1-4.

* cited by examiner

DEVICE FOR A VEHICLE

CROSS REFERENCE

The present application claims the benefit under 35 U.S.C. § 119 of German Patent Application No. DE 102019213170.0 filed on Aug. 30, 2019, which is expressly incorporated herein by reference in its entirety.

The present invention relates to a device for a vehicle, which is attached to a vehicle, in particular, a commercial vehicle, and in which at least one or multiple surroundings sensor(s) is/are attached, a housing wall of the device, preferably the wall in the direction of the detection area of the surroundings sensors, being made from a material pervious to sensor radiation, and at least one housing wall of the device, preferably the wall which is oriented in a direction opposite the detection area of the surroundings sensors, being made from a material absorbing sensor radiation.

BACKGROUND INFORMATION

A device for installing a sensor assembly at a motor vehicle is described in German Patent Application No. DE 10 2010 034 073 A1, which, in particular, is situated on a bumper of the motor vehicle and includes a molded part, which has a solid design and is designed to be pervious to sensor signals, between the sensor assembly and the motor vehicle attachment part. The molded part encloses the sensor assembly in a form-locked manner in the process and includes a surface which is shaped in a complementary manner to the surface of the motor vehicle attachment part.

Such an integration of a sensor into a bumper of a vehicle is only possible for positioning sensors on the front side and rear side of the vehicle. Further installation positions, in particular, laterally on the vehicle, cannot be meaningfully created in this way. Furthermore, the integration of sensors into body parts of the vehicle according to the related art is not suitable for vehicles which do not include any body parts that go all the way around the vehicle, as is the case with commercial vehicles, for example.

SUMMARY

In accordance with and example embodiment of the present invention, a device is provided in which one or multiple surroundings sensor(s) may be accommodated, and which has sensor-transparent properties in the direction of the detection areas of the surroundings sensors. In the opposite direction, in particular, also in all other directions which do not correspond to the direction of the detection area, the device may advantageously be designed to be radiation-absorbing. The device may advantageously be installed on supporting motor vehicle parts, for example a vehicle ladder frame.

Advantageous refinements and embodiments of the present invention are described herein.

Advantageously, in accordance with an example embodiment of the present invention, it is provided that the device includes a shared power supply and/or a shared connection to at least one data bus system of the vehicle. This shared power supply may take over the power supply of all sensors accommodated in the device. In addition or as an alternative, the data bus connection may connect all sensors accommodated in the device to a motor vehicle bus system and enable the data exchange with other vehicle systems. It is furthermore possible that both the power supply and the data bus connection of all sensors takes place via an individual multi-core cable or a wiring harness.

In this way, it is possible that a dedicated power supply and a dedicated data bus connection does not have to be implemented for each sensor, whereby the wiring complexity is reduced. The data bus system may be a data transfer system, a data interface or a data communication system.

It is furthermore advantageous if the surroundings sensors are radar sensors. Radar sensors are today manufacturable to be very small and very cost-effective and are suitable for monitoring the vehicle surroundings and informing the driver if road users, such as bicyclists, are detected in hazardous areas, for example in the blind spot when the vehicle wants to turn. Radar sensors offer the advantage that they may have very sharply delimited detection areas, and thus may reliably detect road users in specific surroundings areas of the vehicle.

It is furthermore advantageous if absorbers for absorbing a portion of the sensor radiation are attached in the interior of the device. Absorbers may be provided which, for example, are implemented as foamed material and have absorbing properties for electromagnetic radiation, for example in that metal particles are incorporated in the foamed material. In addition or as an alternative, it is selectively also possible to use plastic material having a carbon content, as it is offered in the market, for example, under the designation Cawiton®. Such or similar absorbers may be attached at the inner sides of the device walls which are not pervious to radiation to reduce undesirable reflections.

In addition or as an alternative, it is also possible for absorbers to be provided between the individual sensors within the device so that the sensors do not impair one another with their emitted and received output.

Instead of absorbers, it is also possible to use reflectors, it being possible to use only reflectors or to arbitrarily combine absorbers and reflectors with one another. Depending on the need for illumination of the desired detection areas and the reflections resulting in the process, absorbers and reflectors may also be installed in a mixed manner.

The reflectors may be made from metal or be made up of metal-coated plastic material and be designed and installed in such a way that interfering electromagnetic radiation is reflected into spatial directions in which the sensor neither intends to detect nor other sensors or devices are attached and subject to interference. In this way, the interfering electromagnetic radiation is reflected away into spatial directions in which no interferences are to be expected.

In accordance with an example embodiment of the present invention, it is furthermore advantageous if the surroundings sensors are LIDAR sensors and/or video sensors. The material of the device which is pervious to sensor radiation and oriented in the direction of the sensor detection area may be pervious to the optical sensor radiation, for example to infrared radiation. In this way, it is possible that infrared cameras which are able to detect objects in the vehicle surroundings are protected and installed hidden from the observer and in a visually appealing manner.

It is furthermore advantageous if the surroundings sensors are provided for monitoring the presence of objects in the blind spot of the vehicle. The surroundings sensors may have sensor detection areas which are oriented in such a way that objects in the blind spot of the vehicle are detected. Such devices may, in particular, be situated in such a way that their detection area monitors a blind spot of the vehicle, i.e., an area of the vehicle surroundings which the driver cannot see.

It is furthermore advantageous if the device is attached at the vehicle in the area between the front axle and the rear axle. In the case of vehicles including multiple rear axles, it is advantageous that the device is attached in the area between the front axle and the foremost rear axle. In the case of commercial vehicles in a ladder frame design, the area between the front axle and the foremost rear axle offers a variety of installation options, it being possible for devices, such as fuel tanks or exhaust gas devices, to already be installed in this area. It should be noted that the device is configured in such a way that it is set back inwardly at the frame of the vehicle, i.e., in relation to the lateral vehicle silhouette, and the device in its dimensioning is thus configured in such a way that the outer side of the device finishes with the vehicle silhouette. It is thus also particularly advantageous to attach the device adjoining the fuel tank of the vehicle or exhaust gas devices of the vehicle. It is furthermore advantageous that the device is attached above the fuel tank, in particular, between the operator's cab and the utility superstructure of the vehicle. The utility superstructure of the vehicle may, for example, be a cargo area, a box body, a tank superstructure or another superstructure of the vehicle, so that the device may be accommodated between the front edge of this utility superstructure and the rear side of the operator's cab. The device may be oriented in such a way that the detection area is essentially oriented in the vehicle transverse direction, i.e., at a right angle with respect to the usual driving direction of the vehicle.

It is furthermore advantageous if the device is attached in each case on both sides of the vehicle, in particular, in pairs on both sides.

It is pointed out that several of the options, features and advantages of the present invention are described herein with reference to different specific example embodiments. Those skilled in the art will recognize that the features may be suitably combined, adapted or exchanged to arrive at further specific embodiments of the present invention.

BRIEF DESCRIPTION OF THE DRAWINGS

Exemplary embodiments of the present invention are described hereafter based on figures.

DETAILED DESCRIPTION OF EXAMPLE EMBODIMENT

Figure 1:
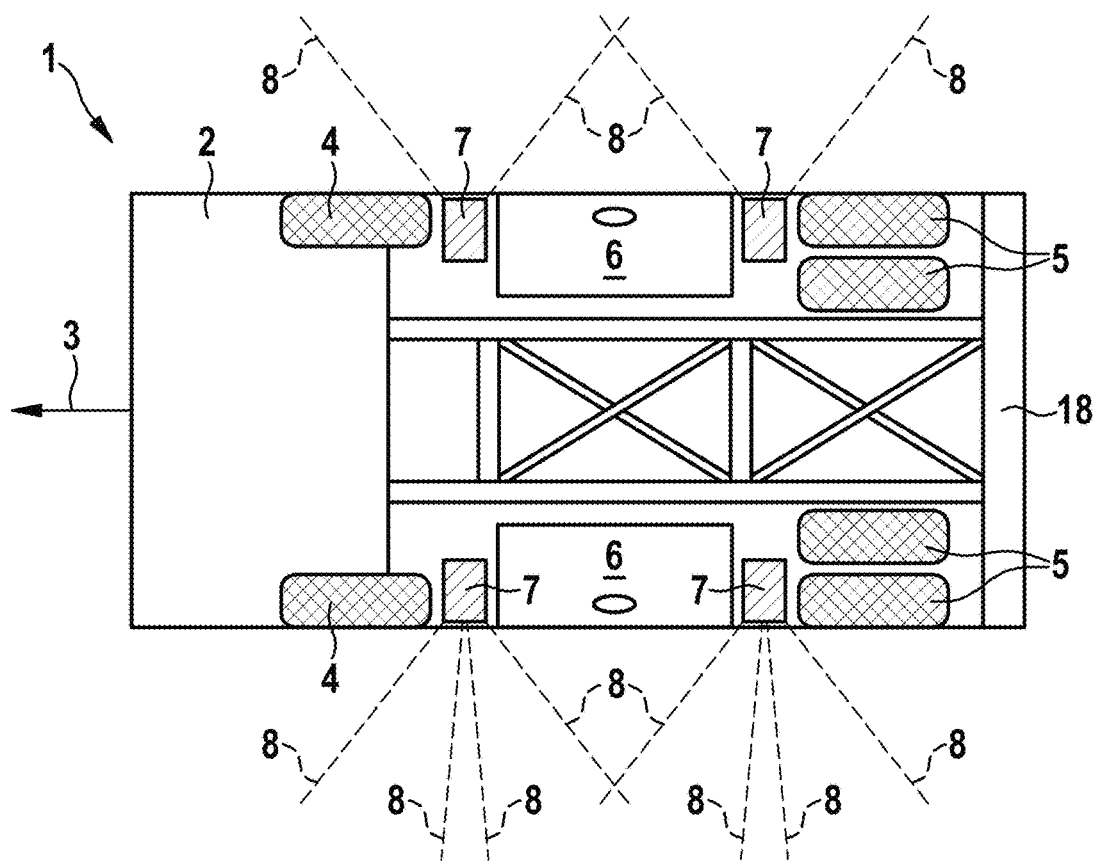
FIG. 1 shows a schematic top view onto the outline of a vehicle according to the present invention.

FIG. 1 shows a schematic top view onto a vehicle 1, which is equipped with device 7 according to the present invention for surroundings sensors. Vehicle 1 is preferably a commercial vehicle, which is oriented in such a way that it normally drives oriented to the left in the direction of driving direction 3. In the front area, this vehicle 1 includes operator's cab 2 in which the driver and possibly the co-driver are situated, and below which the engine is usually installed. Furthermore, the wheels of front axle 4 are shown in the area of operator's cab 2. The wheels of the foremost rear axle, which are implemented as dual tires in FIG. 1, are situated in the rear area of vehicle 1, i.e., at the right edge of FIG. 1. Fuel tanks 6, which are also schematically illustrated, are frequently situated between the wheels of front axle 4 and the wheels of the foremost rear axle 5 in the case of commercial vehicles. Device 7 according to the present invention, which is provided to accommodate surroundings sensors, may be installed multiple times, for example directly behind the wheels of the front axle or also between fuel tank 6 and the foremost wheels of rear axle 5. Devices 7 are implemented as devices which may be installed at the ladder frame of vehicle 1 directly or with the aid of a holding device, or are attachable at other components, for example the fuel tanks.

Devices 7 include one or multiple surroundings sensor(s), which is/are oriented in such a way that its/their detection area(s) 8 detect/detects the surroundings of vehicle 1. Only a single surroundings sensor may be installed in a device 7 in the process, as is illustrated, for example, in the two upper devices 7 in FIG. 1, or it may also include multiple surroundings sensors, so that each of devices 7 includes two or more surroundings detection areas 8, as was shown in the two lower devices 7 of FIG. 1.

Figure 2:
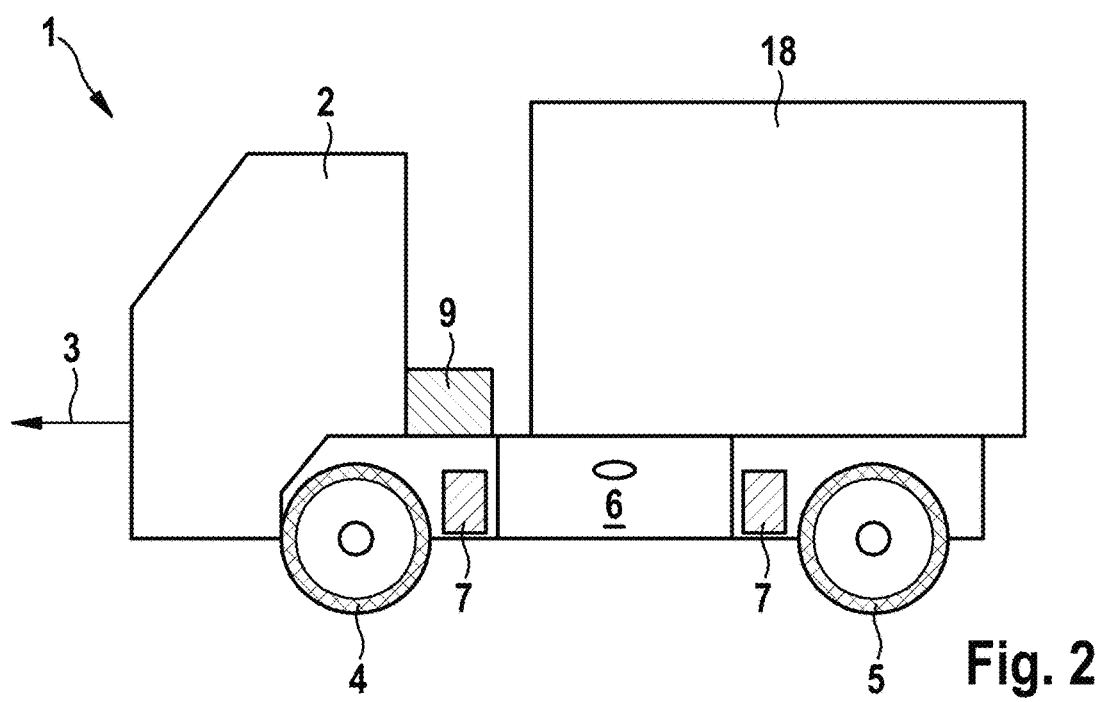
FIG. 2 shows a schematic side view of an outline of the vehicle according to the present invention.

FIG. 2 shows a schematic side view of vehicle 1 according to the present invention. It is again oriented in such a way that it is usually oriented in driving direction 3, i.e., would drive to the left in FIG. 2 when driving normally straight ahead. Vehicle 1 again includes operator's cab 2 in which the driver and the co-driver are situated and which is situated on the engine compartment. Furthermore, the wheels of front axle 4 are shown, as well as the wheels of foremost rear axle 5 on which vehicle 1 is moving. Components of the vehicle, such as fuel tank 6, are plotted again between the wheels of front axle 4 and the foremost wheels of rear axle 5. As an alternative to fuel tank 6, it is also possible that exhaust gas devices of vehicle 1 are provided, or boxes with storage space for vehicle accessories are provided. Furthermore, devices 7 which are attached at the vehicle or vehicle components and accommodate one or multiple vehicle surroundings sensor(s) according to the present invention are shown between the wheels of front axle 4 and the wheels of foremost rear axle 5. Furthermore, a utility superstructure 18 is shown in FIG. 2, which represents a cargo area, a box body or other utility superstructures of the vehicle, depending on the task for which the vehicle is intended. A space usually results between operator's cab 2 and utility superstructure 18 of the vehicle, in which according to the present invention a device for surroundings sensors 9 may be attached, which, for example, monitors the areas laterally next to vehicle 1 with respect to further road users and is able to warn the driver.

Figure 3:
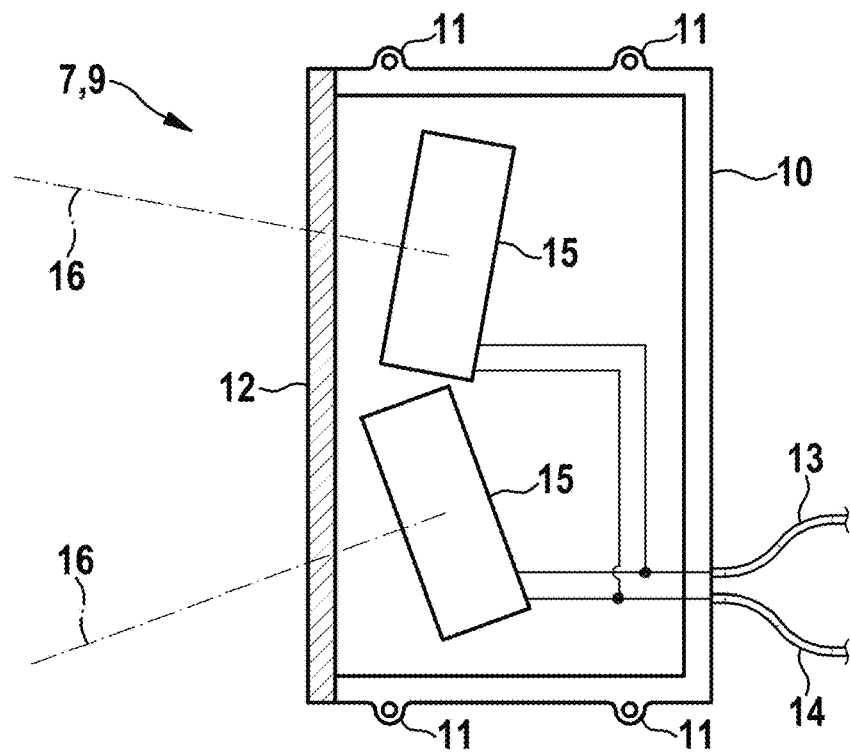
FIG. 3 shows an outline of a cross section through the device according to the present invention.

FIG. 3 shows device 7 or device 9 for accommodating sensor devices in a schematic cross section. Housing shell 10 is apparent, which is designed to be open toward one side. The bottom as well as the side walls of housing shell 10 may advantageously be made from a material absorbing sensor radiation, so that sensor radiation from sensors 15 in the interior of device 7, 9 does not penetrate in undesirable directions to the outside or penetrates to the outside only in a very strongly attenuated manner. Housing shell 10 is closed at the open side with the aid of a cover 12 made of material pervious to sensor radiation. The material pervious to sensor radiation is matched to the wavelength of sensors 15 situated in the interior, so that the sensor radiation is able to penetrate cover 12 of device 7 in the direction of sensor main axes 16 of sensors 15. Housing shell 10 may include mounting eyes 11 or fastening eyes 11, with the aid of which device 7, 9 may be attached at vehicle 1 or with the aid of a holder for device 7, 9. Device 7, 9 furthermore includes connections 13, 14, with the aid of which sensors 15 are connected in the interior of device 7, 9 to a power supply 13 as well as, as an alternative or in addition, to a data bus system of vehicle 1.

It is also possible not to design the connection to power supply 13 and the connection to a data bus system 14 separately, but to design it with the aid of a single, multi-core cable or wiring harness.

It is furthermore possible that each sensor 15 in the interior of device 7, 9 includes a dedicated, i.e., separate, power supply 13 and/or a separate connection to data bus system 14. As an alternative, it is furthermore possible within the scope of the present invention that each sensor 15 includes a dedicated, i.e., separate, connection, this connection in each case being made up of a combination of power supply and data bus connection.

Figure 4:
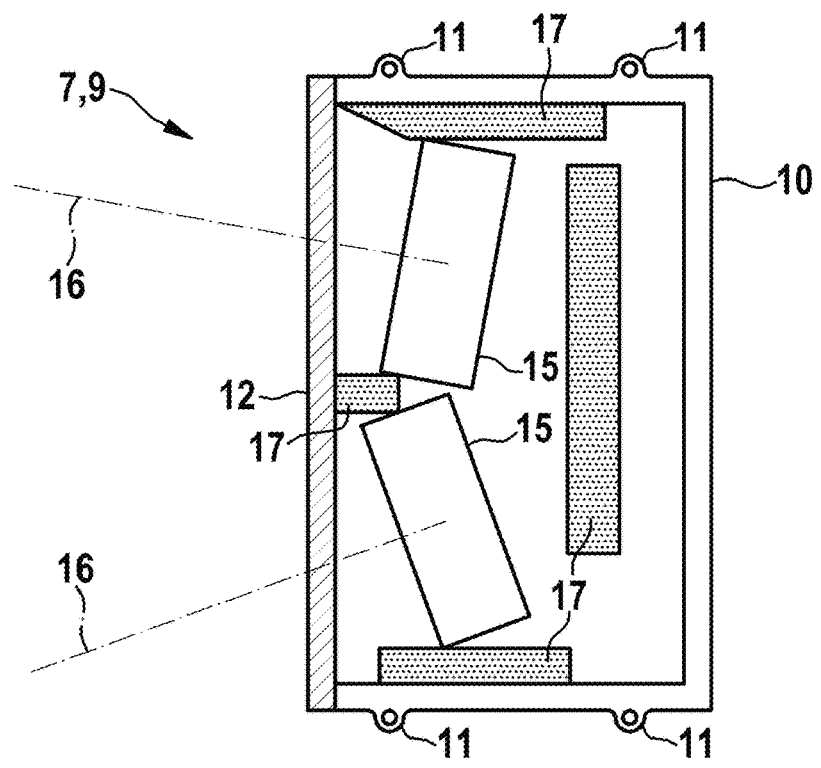
FIG. 4 shows a further outline of a cross section through the device according to the present invention, including a representation of one specific embodiment of the absorbers.

FIG. 4 shows the sensor system from FIG. 3 in a similar manner. Again, housing shell 10 is apparent, including mounting eyes 11 and cover 12 which closes housing shell 10 and is installed in the detection direction of sensors 15 situated in the interior. Sensors 15 are shown in the interior of device 7, 9, which are able to emit and receive sensor radiation in the direction of sensor main axes 16. Device 7, 9 shown in FIG. 4 of course also includes connections to a power supply 13 and/or to a data bus system 14. Furthermore, absorbers 17 are plotted in FIG. 4, which are made from a material which is able to attenuate the wavelength used by sensors 15 particularly well, for example by preferably completely absorbing the electromagnetic radiation of this wavelength range.

These absorbers 17 shown in FIG. 4 are suitable for avoiding undesirable reflections in the interior of device 7, 9, suppressing emissions in directions other than in the desired directions of main beam directions 16, as well as preferably suppressing a cross-talk or an interference between sensors 15 within a device 7, 9. Sensors 15 in the interior of device 7, 9 are fixedly installed in the process, preferably by being firmly fixed at housing shell 10 with the aid of fastening devices. Absorbers 17 may be configured in such a way that they are adapted to the respective arrangement of sensors 15 in the interior of device 7, 9.

What is claimed is:

1. A vehicle comprising:
a frame;
an operator's cabin attached at a front section of the frame;
a utility structure removably attached to a rear section of the frame such that the utility structure is separated in a first direction from the operator's cabin by exterior space that is exterior from the vehicle;
a sensor housing; and
at least one surroundings sensor situated in the sensor housing;
wherein:
the sensor housing is attached to the frame such that the sensor housing is situated in the exterior space between the operator's cabin and the utility structure; and
the sensor housing includes:
a first housing wall (a) that faces in a second direction perpendicular to the first direction and (b) that is made from a material pervious to sensor radiation of the at least one surroundings sensor; and
a plurality of other housing walls that do not face in the second direction and are made from a material which is impervious to, and absorbs, the sensor radiation of the at least one surroundings sensor.

2. The vehicle as recited in claim 1, wherein the first housing wall is a wall situated, relative to the at least one surroundings sensor, in a direction of a detection area of the at least one surroundings sensor, and the plurality of other housing walls include a wall situated in a direction opposite to the detection area.

3. The vehicle as recited in claim 1, wherein the at least one surroundings sensor has a shared power supply and/or a shared connection to at least one data bus system of the vehicle.

4. The vehicle as recited in claim 1, wherein the at least one surroundings sensor includes radar sensors.

5. The vehicle as recited in claim 1, wherein absorbers for absorbing a portion of the sensor radiation are attached in an interior of the sensor housing.

6. The vehicle as recited in claim 1, wherein the at least one surroundings sensor includes LIDAR sensors and/or video sensors.

7. The vehicle as recited in claim 1, wherein the at least one surroundings sensor is configured to monitor presence of objects in a blind spot of the vehicle, and has a sensor detection area and is oriented in such a way that objects in the blind spot of the vehicle are detected.

8. The vehicle as recited in claim 1, wherein the sensor housing is attached to the frame of the vehicle in an area between a front axle of the vehicle and a foremost rear axle of the vehicle.

9. The vehicle as recited in claim 1, wherein the sensor housing is attached adjoining a fuel tank of the vehicle.

10. The vehicle as recited in claim 1, wherein the sensor housing is attached above a fuel tank of the vehicle.

11. The vehicle as recited in claim 1, further comprising a second one of the sensor housings, wherein the sensor housings are attached on both sides of the vehicle.

12. The vehicle as recited in claim 1, wherein an exterior face of the first housing wall is approximately flush with a plane of at least one of a sidewall of the operator's cabin and a sidewall of the utility structure.

13. The vehicle as recited in claim 1, wherein the plurality of other housing wall include all exterior walls of the housing other than the first housing wall.

14. The vehicle as recited in claim 1, wherein the sensor housing includes protrusions that protrude from at least one of the housing walls, each of the protrusions includes a respective mounting eye, and the attachment of the sensor housing to the frame is via the mounting eyes.

15. A vehicle comprising:
a frame;
an operator's cabin attached at a front section of the frame;
a utility structure removably attached to a rear section of the frame such that the utility structure is separated in a first direction from the operator's cabin by a portion of exterior space that is exterior from the vehicle;
a sensor housing; and
at least one surroundings sensor situated in the sensor housing;
wherein:
the sensor housing is attached to the frame such that the sensor housing is situated in the exterior space; and
the sensor housing includes:
a first housing wall (a) that faces in a second direction perpendicular to the first direction and (b) that is made from a material pervious to sensor radiation of the at least one surroundings sensor; and a plurality of other housing walls that do not face in the second direction and are made from a material which is impervious to, and absorbs, the sensor radiation of the at least one surroundings sensor.

* * * * *